United States Patent [19]

Robertson

[11] 4,220,473

[45] Sep. 2, 1980

[54] PROCESS FOR TREATING AZO PIGMENTS

[75] Inventor: George H. Robertson, Cincinnati, Ohio

[73] Assignee: Sun Chemical Corporation, New York, N.Y.

[21] Appl. No.: 50,678

[22] Filed: Jun. 21, 1979

[51] Int. Cl.$^2$ .................... C09B 67/00; C09D 11/02
[52] U.S. Cl. .............................. 106/23; 106/288 Q; 106/308 F; 106/308 N; 106/309
[58] Field of Search .......... 106/308 N, 308 F, 308 Q, 106/308 M, 23, 309, 288 Q

[56] References Cited

U.S. PATENT DOCUMENTS

| | | | |
|---|---|---|---|
| 3,075,849 | 1/1963 | Dreher et al. | 106/308 N X |
| 3,532,520 | 10/1970 | Dawson et al. | 106/288 Q X |
| 3,827,902 | 8/1974 | Schwerin et al. | 106/288 Q X |
| 3,905,825 | 9/1975 | Gaetani et al. | 106/308 N |

*Primary Examiner*—Helen M. McCarthy
*Attorney, Agent, or Firm*—Cynthia Berlow

[57] ABSTRACT

The properties of azo arylamide pigments are improved by treating them with dimer acid-based amines.

10 Claims, No Drawings

PROCESS FOR TREATING AZO PIGMENTS

This invention relates to azo pigments. More particularly it relates to improving the properties of azo arylamide pigments by treating them with amines derived from dimer acids.

BACKGROUND OF THE INVENTION

The treatment of pigments with amines and/or amides is known. U.S. Pat. No. 2,192,956, for example, discloses treating a slurry of a pigment and water with an ester formed from a fatty acid and a hydroxy amine. Pigments treated with fatty acid amides are taught in U.S. Pat. No. 2,442,972. U.S. Pat. No. 2,683,702 teaches slurrying a pigment with an aqueous dispersion of a low molecular weight condensate of an alkylated methylol melamine and a N-alkylol fatty acid amide. U.S. Pat. No. 3,336,147 discloses the use of primary amines and diamines to treat halogenomethylated pigments. According to U.S. Pat. No. 3,655,641, a branched-chain primary aliphatic amine is heated with an azoacylacetarylamide to give a colorant.

Fatty acid amide-coated pigments are taught in U.S. Pat. Nos. 3,728,143, 3,844,810, and 3,953,218. U.S. Pat. No. 3,759,733 teaches that aliphatic amines or amine oxides can be incorporated into azo pigment compositions. Azomethine complexes react chemically with long chain alkyl amines, according to U.S. Pat. No. 3,766,230. Primary, secondary, and tertiary amines are used to treat the specific diarylide pigment composition of U.S. Pat. No. 3,775,148. According to U.S. Pat. No. 3,905,825, azoacetylacetaryl pigments are treated with long chain heterocyclic amines or their aliphatic diamine precursors.

Although such treatments do effect substantial improvements in the properties of inks, nevertheless these treated pigments exhibit deficiencies in the combination of such properties as rheological stability, tinctorial strength, gloss, brightness, and the like. These properties are particularly difficult to achieve with inks prepared with solvents having a high aromatic content. When such inks are used for printing on thin, low-grade, or uncoated paper stock, there is a problem with penetration or blotting, leading to poor print definition and difficulties in running prints on both sides of the paper. One way of solving this problem was suggested in U.S. Pat. No. 3,827,902 wherein the azo pigments are treated with an arylalkylene amine or salt thereof, such as N-benzylpropylene diamine, N-β-phenylethyl diamine, or N-p-xylylpropylene diamine, but here too the desired combination of properties could not be achieved.

It has now been found that these disadvantages can be overcome and a non-penetrating bright yellow pigment that is particularly suitable for use in gravure inks can be obtained by treating pigments with an aliphatic amine based on a dimer acid. Such amines have the general formula

wherein R is a residue of a dimer acid.

These amines may be prepared by any convenient process. One such process is the formation of a nitrile and the subsequent reduction to a diprimary amine which is reacted with acrylonitrile and then reduced to give a diprimary disecondary amine or tetramine, as in the following reaction:

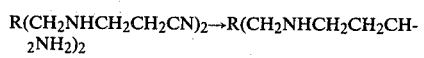

Another method for preparing the amines is to react the dimer acid with a polyamine of the type

wherein x is generally 2 or 3 and y is an integer of 1 through 4, the reaction being controlled to give an amine value greater than about 100. The products are amido or imidazoline amines having the structure

or

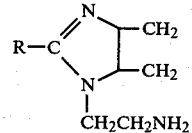

The dimer acids used to prepare the amines of this invention are aliphatic dibasic acids that are generally produced by the polymerization of unsaturated fatty acids. Particularly suitable are the polyunsaturated fatty acids, such as for example linoleic acid, linolenic acid, eleostearic acid, and the like, and mixtures thereof.

The dimer acids resulting from the polymerization of the fatty acids contain small amounts of process impurities, such as residual monobasic acids and trimer acids. The amines prepared therefrom contain a number of oligomers as a result of the impurities in the acids and the difunctionality of the acids and the amines. These amines are available commercially, such as the Kemamines and Kemamides sold by Humko Sheffield, in grades ranging between about 75 to 95% dimer acids, 4 to 25% trimer acids, and up to 3% monobasic acids; they may range in amine value from about 100 to 500, and preferably from about 150 to 400.

These aliphatic amines are contacted with an azoacetarylamide pigment. Suitable pigments are those prepared by coupling diazotized or tetrazotized mono- or diarylamines with an acetoacetarylamide. Suitable aryl amines include, but are not limited to, 3,3'-dichlorbenzidine, 4,4'-diamino-3,3'-dichlorbiphenyl, 1-amino-2-methoxy-4-nitrobenzene, 1-amino-4-methoxy-2-nitrobenzene, 1-amino-4-chlor-2-nitrobenzene, 4-chloraniline, 2-chloraniline, 4-aminobenzamide, 4-methyl-3-aminobenzamide, 4-methoxy-3-aminobenzamide, 2-amino-1-methyl-4-nitrobenzene, 1-amino-4-methyl-2-nitrobenzene, and the like, and mixtures of these.

Suitable coupling components include, but are not limited to, acetoacetarylides, such as acetoacetanilide, 1-acetoacetyl-2-methylaminobenzene, acetoacetyl-4-methylaminobenzene, acetoacetyl-4-ethoxyaminobenzene, acetoacetyl-2-chloroaminobenzene, acetoacetyl-4-chloroaminobenzene, acetoacetyl-4-amidoaminobenzene, acetoacetyl-2,4-dimethylaminobenzene, acetoacetyl-2-methoxyaminobenzene, and the like, and their mixtures.

The pigment and the amine are generally contacted under aqueous conditions. In the case of couplings with acetoacetanilide, however, the pigment and the amine may be contacted under anhydrous conditions, preferably at a temperature above about 50° C. The treated pigment may be used directly, but preferably it is used in combination with untreated pigment in a ratio of amounts of about 1 part of treated pigment:up to about 5 parts of untreated pigment to obtain the desired properties.

The amount of the aliphatic amine used in the process of this invention may vary widely, depending upon the particular pigment that is being treated. In general, it is used in an amount of 1–100, and preferably about 5–35, percent, based on the weight of the pigment, when aqueous conditions are used. When the conditions are anhydrous, an excess of the dimer acid amine is used and the amount, based on the weight of the pigment, may be up to about 200 percent or higher.

When aqueous conditions are used, the aliphatic amine may be added to the pigment component at any convenient time, e.g., before or during coupling; to the aqueous slurry after coupling; or to the aqueous presscake of the pigment. It may be added as is, as an aqueous dispersion of the free base, dissolved or partially dissolved as its acidic salt, or as a solution in an organic solvent, but the final heating involves the amine in its free base form. The heating may be carried out on the composition as a slurry or as a presscake and, if desired, it may be under pressure.

The preferred process is to add the primary amine as its acetate salt to an acidic aqueous slurry of the azo pigment; heat at about 50 to 100, and preferably about 80° to 95° C.; adjust the pH to 10 or more; wash, and dry at a temperature above 50° C.

The pigments treated by the process of this invention are particularly suitable for use in publication rotogravure inks. The pigments are easily dispersed in the ink vehicle. The inks do not penetrate uncoated paper stock, and they have excellent flow properties, color strength, brightness, and gloss.

The invention is illustrated by the following examples in which all parts and percentages are by weight unless otherwise specified.

EXAMPLE 1

(A) 75.5 Parts of sodium nitrite was added to a slurry of 181 parts of 90% water-damped 4,4'-diamino-3,3'-dichlorobiphenyl dihydrochloride and 232 parts of 8.6 N hydrochloric acid in 800 parts of water. The mixture was stirred at 0° C. for 1 hour, 8.75 parts of sulfamic acid was added to remove excess nitrous acid, and the volume was adjusted to 3000 parts by adding water.

(B) The resulting tetrazo solution of 4,4'-diamino-3,3'-dichlorobiphenyl was added over 1 hour at 20° C. to a suspension of 185.9 parts of 1-acetoacetylaminobenzene dissolved in 300 parts of water, 222.4 parts of 50% w/w aqueous sodium hydroxide solution, and 145.2 parts of 70% aqueous acetic acid; when the solution was complete, an additional 103.6 parts of 70% aqueous acetic acid was added, resulting in a pigment slurry having a pH of 3.7.

(C) 44.8 Parts of a 95%-dimer acid-based tetramine (available as Kemamine DD 3695 from Humko Sheffield) dispersed in 400 parts of water and 14.8 parts of 70% aqueous acetic acid was added to the product of part (B), the mixture heated to 95° C., and 234.8 parts of 50% w/w aqueous sodium hydroxide added to give a pH of 11.5. Heating was continued for an additional 30 minutes; the mixture was filtered, washed with water to remove the inorganic salts, and dried at 85° C.

(D) A printing ink was prepared from toluene, a phenolic-modified rosin binder, and the pigment product of part (C). When printed on uncoated paper, it did not penetrate the paper and was superior in strength, gloss, and brightness to an ink wherein the pigment was treated with N-tallow-1,3-propylene diamine instead of the dimer acid-based tetramine.

EXAMPLE 2

The procedure of Example 1 was repeated except that each of the following was used instead of 1-acetoacetylaminobenzene: 1-acetoacetyl-2-methylaminobenzene, 1-acetoacetyl-2-methoxyaminobenzene, and 1-acetoacetyl-2, 4-dimethylaminobenzene. The results were comparable.

EXAMPLE 3

The procedure of Example 1 was repeated except that each of the following was used instead of 4,4'-diamino-3,3'-dichlorbiphenyl: 4,4'-diamino-3,3'-dimethoxybiphenyl and 4,4'-diaminotetrachlorbiphenyl. The results were comparable.

EXAMPLE 4

The procedure of Example 1 was repeated with 78.9 parts of the tetramine instead of 44.8 parts. The results were comparable.

EXAMPLE 5

The procedure of Example 1 was repeated except that the tetramine was prepared from an 80%-dimer acid mixture (available as Kemamine DD 3680 from Humko Sheffield). The results were comparable.

EXAMPLE 6

The procedure of Example 1 was repeated except that the tetramine was replaced by each of the following amido/amines prepared by reacting a dimer acid or ester with diethylene triamine and having the indicated amine value:

| Amido Amine | Amine Value |
|---|---|
| Kemamide 3603 | 370–400 |
| Kenamide 3608 | 330–360 |
| Kemamide 3635 | 230–246 |

The results were comparable.

EXAMPLE 7

The procedure of Example 1 was repeated except that the 1-acetoacetylaminobenzene was replaced by 200.6 parts of 1-acetoacetyl-2-methylaminobenzene and the tetramine was replaced by the amido/amine Kemamide 3608.

When an ink prepared from this treated pigment was printed on uncoated paper, it did not penetrate and was superior in brightness and gloss to an ink wherein the pigment was treated with N-tallow-dipropylene triamine instead of the dimer acid-based tetramine.

EXAMPLE 8

(A) 108.5 Parts of 1-acetoacetyl-2-methoxyaminobenzene was dissolved in 2500 parts of water and 120 parts of 50% w/w aqueous sodium hydroxide and precipitated by the addition of 131 parts of 70% aqueous acetic acid.

(B) The mixture of part (A) was coupled over a period of 1 hour at 20° C. with a diazo prepared by adding 101.6 parts of sodium nitrite to a mixture of 84.0 parts of 1-amino-2-methoxy-4-nitrobenzene, 174 parts of 8.6 N hydrochloric acid, and 375 parts of water, stirring for 1 hour, diluting wih water to 2000 parts by volume, and adding 6.3 grams of sulfamic acid to remove excess nitrite.

(C) The resultant slurry was treated with a dispersion of b 48.4 parts of an 80%-dimer acid-based tetramine (Kemamine DD 3680)in 500 parts of water and 20 parts of 70% aqueous acetic acid; the slurry was heated to 95° C., the pH was adjusted to 10.5 with 50% w/w sodium hydroxide; and the heating was continued for an additional 30 minutes. The product was filtered, washed, and dried at 85° C.

(D) A printing ink prepared with the product of part (C) did not penetrate uncoated paper and had gloss and color strength that were superior to those of an ink wherein the pigment was not treated with an amine.

EXAMPLE 9

The procedure of Example 1 was repeated except that the dimer acid-based tetramine was replaced by a fatty acid amide having no free amine groups. An ink containing the pigment treated with this amide penetrated uncoated paper and was inferior to the ink of Example 1 in color strength, gloss and brightness.

EXAMPLE 10

(A) 10 Parts of a conventional dry powder pigment prepared by coupling tetrazotized 4,4'-diamino-3,3'-dichlorbiphenyl and acetoacetaminobenzene (Pigment A) was mixed with 20 parts of a dimer acid-based tetramine (Kemamine DD 3680) and heated at 85° C. for 10 hours.

(B) 2 Parts of the mixture of part (A) was mixed with 10 parts of Pigment A and dispersed in a toluene-rich publication gravure ink. The properties were similar to those of the product of Example 1(D).

(C) A mixture of 10 parts of Pigment A and 20 parts of the tetramine (Kemamine DD 3680) was added directly to a toluene-rich publication gravure ink. The desired properties were not obtained.

EXAMPLE 11

(A) 10 Parts of Pigment A and 20 parts of a dimer acid-based tetramine (Kemamine DD 3680) were refluxed in toluene for 6 hours.

(B) The product of Part (A) and 10 parts of Pigment A were worked into a publication gravure ink. The properties were similar to those of Example 1(D).

EXAMPLE 12

The procedure of Example 10 (A) was repeated. The product mixture was added to 10 parts of a pigment prepared from 3,3'-dichlorbiphenyl and acetoacet-m-xylide and dispersed in an ink. The product exhibited the desired properties.

What is claimed is:

1. A process for modifying an azo arylamide pigment which comprises contacting at a temperature of at least about 50° C. the pigment with an amine of a dimer acid, an amido amine of a dimer acid, or an imidazoline amine of a dimer acid having an amine value of about 100 to 500, said amine of the dimer acid having the structure

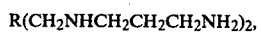

said amido amine of the dimer acid having the structure
R(CONHCH$_2$CH$_2$NHCH$_2$CH$_2$NH$_2$)$_2$ and said imidazoline amine of the dimer acid having the structure

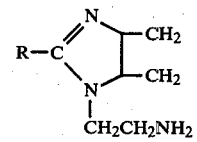

wherein R is a residue of a dimer acid.

2. The process of claim 1 wherein the pigment is contacted under aqueous conditions with about 1 to 100 percent, based on the weight of the pigment, of an amine of a dimer acid, an amido amine of a dimer acid, or an imidazoline amine of a dimer acid.

3. The process of claim 1 wherein the pigment is contacted with about 5 to 35 percent, based on the weight of the pigment, of an amine of a dimer acid, an amido amine of a dimer acid, or an imidazoline amine of a dimer acid.

4. The process of claim 1 wherein the amine value is about 150 to 400.

5. The process of claim 1 wherein the amine is added as its acetate salt.

6. The process of claim 1 wherein the pigment is contacted under anhydrous conditions with an excess of an amine of a dimer acid, an amido amine of a dimer acid, or an imidazoline amine of a dimer acid.

7. An azo pigment composition prepared by the process of claim 2.

8. An azo pigment composition prepared by the process of claim 6.

9. A printing ink containing an azo pigment composition prepared by the process of claim 1.

10. A printing ink containing a mixture of an azo pigment and a modified azo pigment composition prepared by the process of claim 1.

* * * * *